US012489960B2

(12) United States Patent
Hufford et al.

(10) Patent No.: US 12,489,960 B2
(45) Date of Patent: Dec. 2, 2025

(54) COMMUNICATION OF DETECTED GRASPING FORCES IN A SURGICAL ROBOTIC PLATFORM

(71) Applicant: Asensus Surgical US, Inc., Durham, NC (US)

(72) Inventors: Kevin Andrew Hufford, Cary, NC (US); Matthew Robert Penny, Holly Springs, NC (US)

( * ) Notice: Subject to any disclaimer, the term of this patent is extended or adjusted under 35 U.S.C. 154(b) by 326 days.

(21) Appl. No.: 15/917,897

(22) Filed: Mar. 12, 2018

(65) Prior Publication Data
US 2021/0307861 A1    Oct. 7, 2021

(51) Int. Cl.
| | |
|---|---|
| A61B 90/00 | (2016.01) |
| A61B 34/00 | (2016.01) |
| H04L 65/612 | (2022.01) |
| H04L 65/70 | (2022.01) |
| H04L 65/75 | (2022.01) |
| H04L 65/80 | (2022.01) |
| H04N 21/8352 | (2011.01) |
| H04N 21/84 | (2011.01) |
| H04N 21/845 | (2011.01) |
| A61B 17/00 | (2006.01) |
| A61B 34/37 | (2016.01) |

(52) U.S. Cl.
CPC ......... *H04N 21/8456* (2013.01); *A61B 34/76* (2016.02); *A61B 90/37* (2016.02); *H04L 65/612* (2022.05); *H04L 65/70* (2022.05); *H04L 65/762* (2022.05); *H04L 65/80* (2013.01); *H04N 21/8352* (2013.01); *H04N 21/84* (2013.01); *A61B 2017/00022* (2013.01); *A61B 2017/00115* (2013.01); *A61B 34/37* (2016.02); *A61B 2090/065* (2016.02); *A61B 2090/365* (2016.02)

(58) Field of Classification Search
CPC ............ H04N 21/8456; H04N 65/4084; A61B 34/76; A61B 90/37; A61B 2090/365; A61B 2017/00022; H04L 65/602
USPC .......................................................... 345/633
See application file for complete search history.

(56) References Cited

U.S. PATENT DOCUMENTS

| | | | |
|---|---|---|---|
| 9,204,830 B2 | 12/2015 | Zand et al. | |
| 9,547,940 B1 * | 1/2017 | Sun | ........................ G06T 7/344 |

(Continued)

FOREIGN PATENT DOCUMENTS

| | | |
|---|---|---|
| WO | 2016056332 A1 | 4/2016 |
| WO | 2017031568 A1 | 3/2017 |

OTHER PUBLICATIONS

Schemes for the Identification of Tissue Types and Boundaries at the Tool Point for Surgical Needles, Peter N. Brett, Andrew J. Harrison, and Trevor A. Thomas, IEEE Transactions On Information Technology in Biomedicine, vol. 4, No. 1, Mar. 2000.*

(Continued)

*Primary Examiner* — Javid A Amini

(57) ABSTRACT

A system and method for displaying tissue information on a display screen includes a camera capturing an image of an anatomical working site including a surgical instrument, and a display displaying the image. A tissue information detection device determines information about the health, pathology etc. of tissue in contact with a surgical instrument, or about an interaction between the surgical instrument and the tissue. The system renders overlays depicting the tissue information with the image on the display.

16 Claims, 3 Drawing Sheets

(56) References Cited

U.S. PATENT DOCUMENTS

| | | | |
|---|---|---|---|
| 2002/0150966 A1* | 10/2002 | Muraca | G01N 33/5088 |
| | | | 702/19 |
| 2004/0024288 A1* | 2/2004 | Uchikubo | A61B 1/0005 |
| | | | 600/101 |
| 2006/0256191 A1 | 11/2006 | Iketani et al. | |
| 2008/0177279 A1 | 7/2008 | Sumanaweera et al. | |
| 2009/0201577 A1 | 8/2009 | LaPlante et al. | |
| 2010/0137882 A1* | 6/2010 | Quaid, III | A61B 17/3403 |
| | | | 606/130 |
| 2010/0169815 A1* | 7/2010 | Zhao | B25J 9/1633 |
| | | | 606/130 |
| 2011/0224574 A1* | 9/2011 | Sadler | G01N 33/5091 |
| | | | 600/562 |
| 2011/0234782 A1* | 9/2011 | Ehrhardt | A61B 1/0684 |
| | | | 362/574 |
| 2012/0156712 A1* | 6/2012 | Takats | H01J 49/168 |
| | | | 435/287.1 |
| 2012/0274631 A1* | 11/2012 | Friedland | G06T 19/20 |
| | | | 606/280 |
| 2013/0253489 A1* | 9/2013 | Nau, Jr. | A61B 18/22 |
| | | | 606/17 |
| 2013/0296908 A1* | 11/2013 | Schulte | A61B 17/320068 |
| | | | 606/169 |
| 2014/0005483 A1* | 1/2014 | Ohashi | A61B 1/0646 |
| | | | 600/162 |
| 2014/0081659 A1* | 3/2014 | Nawana | A61B 5/4509 |
| | | | 705/3 |
| 2014/0188133 A1* | 7/2014 | Misener | A61B 8/0841 |
| | | | 606/130 |
| 2015/0182107 A1 | 7/2015 | King et al. | |
| 2015/0264339 A1* | 9/2015 | Riedel | H04N 13/383 |
| | | | 348/54 |
| 2015/0305811 A1 | 10/2015 | Neuberger | |
| 2016/0100763 A1* | 4/2016 | Fengler | H04N 23/11 |
| | | | 600/473 |
| 2016/0174848 A1* | 6/2016 | Ammar | A61B 5/0084 |
| | | | 600/476 |
| 2016/0239617 A1* | 8/2016 | Farooq | G16H 10/60 |
| 2016/0249989 A1* | 9/2016 | Devam | A61B 5/021 |
| | | | 345/633 |
| 2016/0262750 A1* | 9/2016 | Hausen | A61B 17/32 |
| 2017/0143260 A1* | 5/2017 | Latimer | A61B 18/20 |
| 2017/0188792 A1* | 7/2017 | Itkowitz | A61B 1/0005 |
| 2017/0325893 A1* | 11/2017 | Ludwin | A61B 5/6885 |
| 2018/0064499 A1* | 3/2018 | Itkowitz | B25J 9/1682 |
| 2018/0092700 A1* | 4/2018 | Itkowitz | A61B 90/36 |
| 2019/0090969 A1* | 3/2019 | Jarc | A61B 34/35 |
| 2020/0078105 A1* | 3/2020 | Itkowitz | A61G 13/02 |
| 2021/0065896 A1* | 3/2021 | Chiu | G16H 40/63 |

OTHER PUBLICATIONS

Contextual Anatomic Mimesis Hybrid In-Situ Visualization Method for Improving Multi-Sensory Depth Perception in Medical augmented Reality, Christoph Bichlmeier et al., 2007 IEEE.*

Apr. 2014, Published by ACM, Stereoscopic augmented reality system for supervised training on minimal invasive surgery robots, Florin Octavian Matu et al.*

* cited by examiner

COMMUNICATION OF DETECTED GRASPING FORCES IN A SURGICAL ROBOTIC PLATFORM

This application claims the benefit of U.S. Provisional Application No. 62/470,120, filed Mar. 10, 2017.

FIELD OF THE INVENTION

The invention relates generally to communication of information about a surgical procedure to operating room personnel. More specifically, the invention relates to communication of information concerning tissues, objects or instruments within the operative working site to operating room personnel, including the surgeon conducting the procedure.

BACKGROUND

There are several methods and systems for using multi- or hyper-spectral imaging for in vivo tissue diagnosis. These allow users to intra-operatively distinguish between different types of tissue, whether different organs, vessels or even cancerous versus benign tissue. Many of these techniques and systems are used in the endoscopic field as an alternative to biopsies. Other technologies exist for obtaining information about tissues or object within the operative working site. For example, computer vision can be used to identify the boundaries of surgical instruments "seen" by the surgical scope within the operative site.

There are various types of surgical robotic systems on the market or under development. Some surgical robotic systems use a plurality of robotic arms. Each arm carries a surgical instrument, or the camera used to capture images from within the body for display on a monitor. Other surgical robotic systems use a single arm that carries a plurality of instruments and a camera that extend into the body via a single incision. These types of robotic systems use motors to position and orient the camera and instruments and, where applicable, to actuate the instruments. Input to the system is generated based on input from a surgeon positioned at master console, typically using input devices such as input handles and a foot pedal. Motion and actuation of the surgical instruments and the camera is controlled based on the user input. The image captured by the camera is shown on a display at the surgeon console. The console may be located patient-side, within the sterile field, or outside of the sterile field.

Some surgical imaging systems offer intra-operative tissue diagnostic capability using fluorescence. Often fluorescence imaging relies on the introduction of fluorescent agents (such as indocyanine green (ICG)) that are administered to tissue and illuminated with a certain wavelength of light. Some tissue types auto-fluoresce when exposed to light of particular wavelengths, allowing fluorescence imaging of those tissues. In systems offering fluorescence, the surgeon can view the fluorescence images by observing the system's camera display.

This application describes methods for presenting tissue information, such as the results of tissue diagnosis techniques or tissue-identifying steps, or instrument information, to surgeons or users of a surgical robotic system.

DETAILED DESCRIPTION

This application describes a system and method for presenting to the surgeon information obtained about the health, type, nature, location etc (referred to here as "tissue information") of tissue that lies within the field shown on the video display being observed by the surgeon. The displayed tissue information may be information obtained using a tissue information detection system that can detect tissue density, inflammation, ischemia, oxygen levels, blood presence (e.g. via transmittance loss, hemoglobin detection or blood flow detection) or identifies types of tissue using fluorescent techniques or other methods, or that represents an interaction between a surgical instrument and tissue (e.g. squeezing force applied by forceps, or the existence/absence of contact between a part of an instrument and adjacent tissue). Other tissue information might be obtained information about the location of tissue structures or features such as tumors, blood vessels, ureters, lymph nodes, etc. In many of the described embodiments, the information is communicated by rendered overlays (also referred to as indicia) displayed on the endoscopic display.

Figure 1:
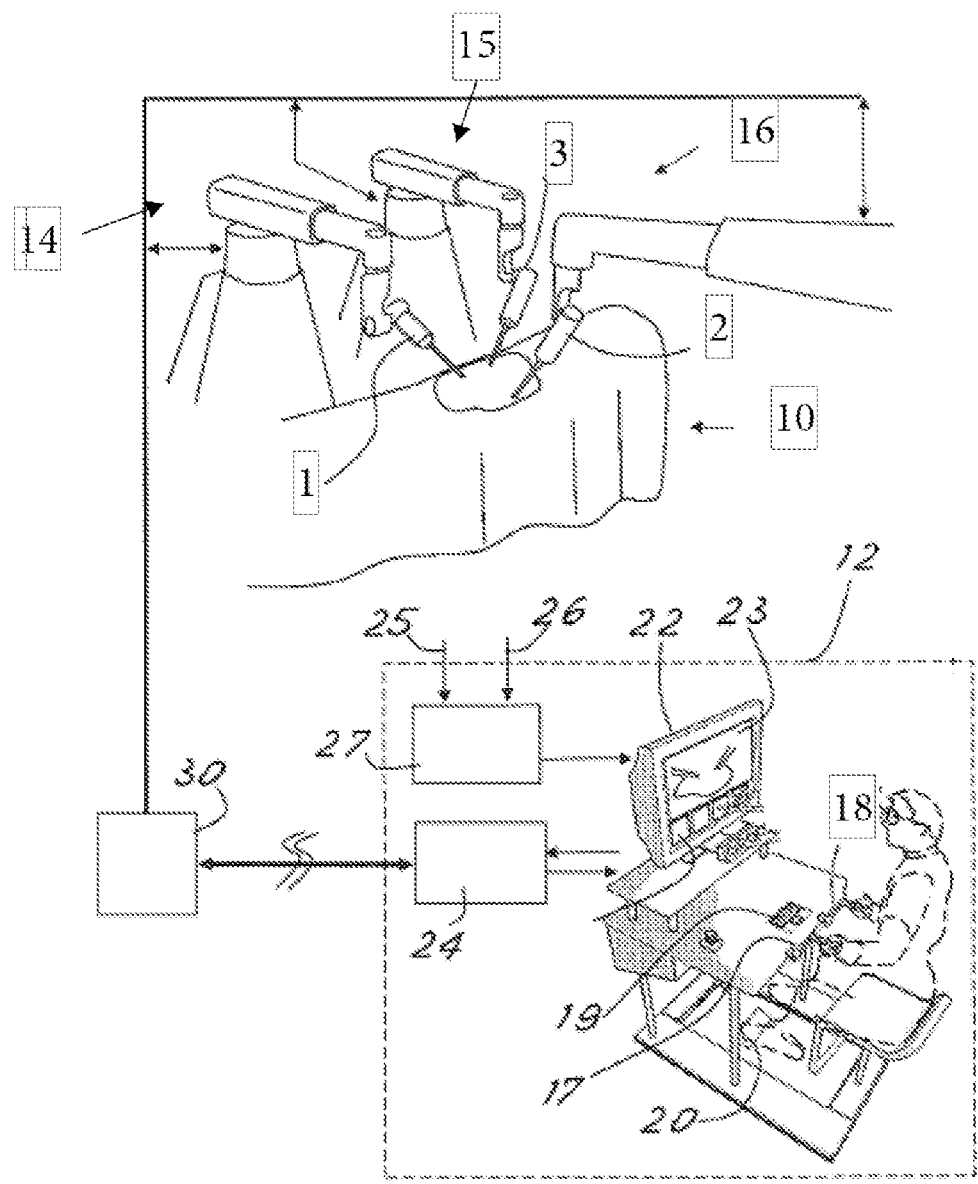
FIG. 1 shows a surgical robotic system which may use aspects of the disclosed invention.

FIG. 1 shows a system that may incorporate the inventions described herein. The system 10 comprises at least one robotic arm which acts under the control of a control console 12 managed by the surgeon who may be seated at the console. The system shown in FIG. 1 includes multiple robotic arms 14, 15, 16. Three such arms are shown but a larger or smaller number may be used. Each robotic arm can support and operate a surgical instrument 1, 2, 3 for use on a patient. One of the instruments 3 is preferably a camera which records the operating field inside the patient. These images are shown in a display 23 at the surgeon console 12.

The arms 14-16 are operated by an electronic control unit 30 which causes the arms to perform the movements entered via the console 12. The unit 30 will receive the high-level movement commands (for example, desired position and inclination of the tool supported by the robot) and will execute them, converting them into the corresponding sequences of signals to be sent to the individual motors of the robot arm articulations. The console includes input devices 17, 18 which can be gripped by the surgeon and moved so as to deliver instructions to the system as to the desired movement and operation of the instruments supported by the arms. The surgeon's movements are suitably reproduced by the surgical instruments by means of movement of the robotic arms. The input devices may be equipped to provide the surgeon with tactile feedback so that the surgeon can feel on the input devices 17, 18 the forces exerted by the instruments on the patient's tissues. The console may also include a keyboard 19 and/or touch screen and/or other command input devices. These other command devices might include a pedal device 20, and a button(s) on or in proximity to one or both handles of the input devices 17, 18. Other features are described in Applicant's U.S. Pat. No. 9,360,934 which is incorporated herein by reference.

Components of a system for communicating detected tissue information include one or more surgical instrument moveable at a surgical site, such as the instruments 1, 2, and means for determining the location of at least a part of the surgical instrument at the surgical site. For example, a computer vision system can be used to recognize the instrument pose in the image of the instruments captured by the endoscopic camera 3. In other embodiments, the pose can be determined by a processor of the robotic system based on kinematics.

The system further includes a (preferably real-time) tissue information detection feature which captures tissue information during the course of the procedure. This might be a fluorescence system, an optical tissue interrogation system such as that described in U.S. application Ser. No. 15/917, 898 entitled "Instrument for Optical Tissue Interrogation" filed on the same day as the present application, which is incorporated herein by reference, or other types of systems for collecting information about the health, type, nature, location etc of tissue.

Another form of tissue information might relate to the interaction of the tissue with instruments in use by the surgeon. For example, the robotic system might determine the amount of force being applied to tissue by the jaws that are grasping the tissue. This force information may come from any number of sources, including, but not limited to Fabry-Perot interferometry, Fiber-Bragg gratings, strain gages, load cells, force sensors inside the instrument itself, force sensors inside the robotic surgical system to which the instrument itself is attached, etc.

Another type of instrument for obtaining tissue information that may represent an interaction with the tissue will be discussed below in connection with FIG. 5 and is described in detail in U.S. application Ser. No. 15917,898 "Instrument for Optical Tissue Interrogation". Briefly stated, this type of instrument may be used to obtain tissue information representing the existence or absence of contact between a part of the instrument and tissue, or an identification of the part of the instrument that is contacting tissue and the part of the instrument that is not contacting tissue.

The system further includes a communication device configured to generate a visual, auditory and/or tactile notification communicating the tissue information for tissue in contact with in proximity to, or in the expected path the surgical instrument or a particular part of the surgical instrument.

In a first embodiment, communicated tissue information takes the form of visual overlays or cues displayed on the camera display 23 along with the video information captured by the camera of the vision system. The tissue information may be displayed in real time as it is obtained from the tissue information detection system.

Figures 2A, 2B:
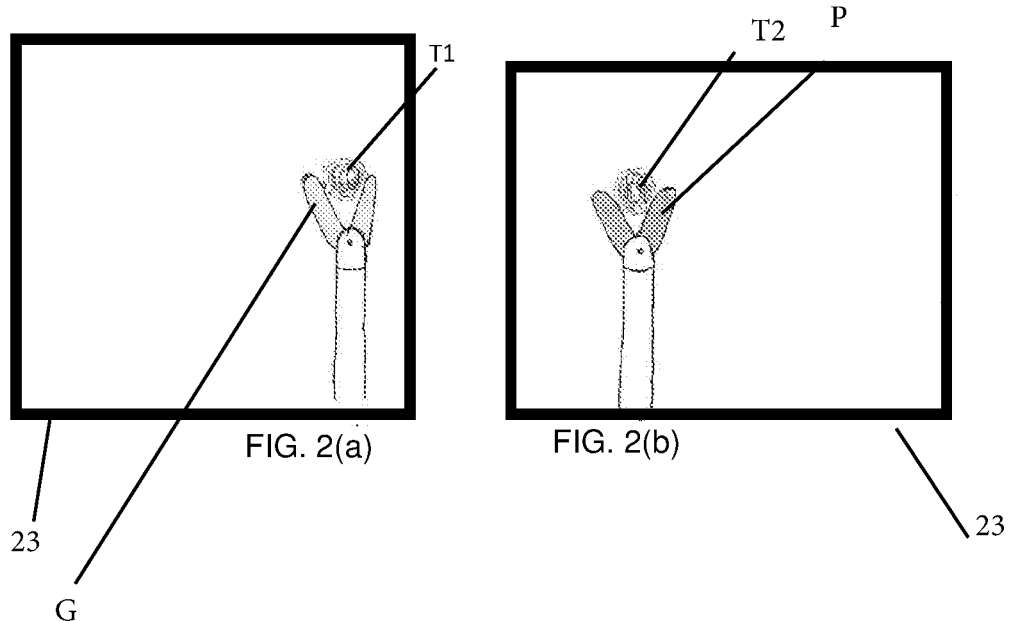
FIGS. 2(a) and 2(b) show examples of a video display in which color overlays are used over a portion of an image of a surgical instrument captured using the endoscopic system.

In some implementations, the overlays may be shown directly on the endoscopic view, even to the extent of being positioned on the image of surgical instrument tips themselves. FIGS. 2(a) and 2(b) show examples of a video display in which color overlays are used over a portion of an image of a surgical instrument captured using the endoscopic system. These figures illustrate use of color-changing or pattern-changing overlays to communicate to the surgeon tissue information about tissue in question. When a surgeon is grasping tissue using an instrument, the instrument is visible on the image shown on the camera display. This first embodiment is configured to overlay shading of a particular color or pattern over the image of the jaws, with the color or pattern representing a particular type of tissue information (e.g. tissue pathology or certain metrics of the tissue), or informing the user as to whether tissue information is available. In this example, as the user uses an instrument to grasp a first tissue T1 (FIG. 2(a)), the jaws of the instrument on the image display of the instrument are colored using an overlay G that is green. When the instrument is then used to grasp a second tissue T2 (FIG. 2(b)), the jaws of the instrument on the image display are colored using an overlay P that is pink. The system may change the jaw overlay for the instrument grasping tissue to a first color or pattern to a second color or pattern depending on the type of information to be conveyed using the overlays. One of the colors/patterns may represent one specific tissue pathology or metric, and the other color/pattern may represent a second tissue pathology/metric. Alternatively, one of the colors/patterns may serve to indicate that tissue pathology or other metrics are available for that tissue, and the other color/pattern may serve to indicate that tissue pathology/metrics are unavailable. Where information is available, the user may be prompted to give a command to the system using a manual, verbal, eye tracking, or other form of input to display the available information. Upon receiving the command, the system may display the information on the screen.

It can be appreciated that this embodiment can be adapted for instruments that do not have jaws. For example, the overlay may be rendered over the tip of an instrument probe that is in contact with the tissue in question.

Figure 3:
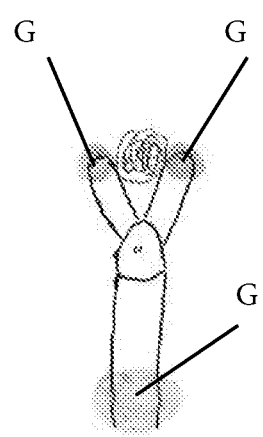
FIG. 3 illustrates an alternative overly display format suitable for displaying surgical instrument information on a camera image display.

FIG. 3 depicts an image of a surgical instrument grasping tissue as it might appear on the display 23, and it shows that the overlays may appear over parts of the instrument other than the jaws. In this example, green overlays G are positioned at the instrument tips, as well as on the shaft of the instrument. It will be appreciated that many variations are conceivable within the scope of the disclosed invention. Overlays may also be rendered on the endoscopic view between the jaws, at or near the jaw pivot, or any combination of the locations described here. In other implementations, the overlays may be made on rendered images of the surgical instruments on another portion of the screen Where the tissue information to be communicated is a depiction of the force being applied to the tissue by an instruments jaws, overlays such as those shown in FIGS. 2(a)-3 might show continuous changes along a color spectrum as the force increases or decreases, or stepwise color changes (e.g. green to yellow to red) as the force moves between force thresholds. Alternatively, the system might render a graphic on the display that increases or decreases in size as the force increases, and that is resized in the opposite direction as the force decreases. Any combination of the described visual renderings might also be used.

Figures 4A, 4B:
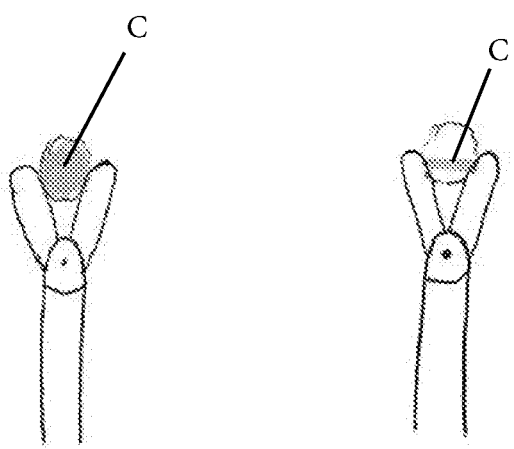
FIGS. 4(a) and 4(b) illustrate another embodiment of an overlay display format suitable for displaying tissue information on a camera image display.

FIGS. 4(a) and 4(b) also depict images of a surgical instrument as it might appear on the display using a different type of information overlay. FIG. 4(a) illustrates that a color or pattern overlay may be superimposed over grasped tissue, or a portion of the grasped tissue. Here grasped tissue T3 has a pink overlay C over it. This overlay may be within the boundaries of the grasped tissue if the boundaries are determined (e.g. using the computer vision system). As described above, different colors/patterns might represent different tissue pathologies/metrics, or indicate the presence/absence of pathology information or metrics, or simply serve to identify the boundaries of a particular type of tissue (blood vessel, tumor etc) to the surgeon. Where information is available, the user may be prompted to give a command to the system as noted above to display the available information.

FIG. 4(b) is similar to FIG. 4(a) but shows that the overlay can be used to indicate a difference in the pathology within the tissue that is being grasped, possibly alerting the surgeon to the location of a vessel or tumor material within the tissue being grasped. In this figure, a portion of the grasped tissue has a pink overlay C over it.

Figure 5:
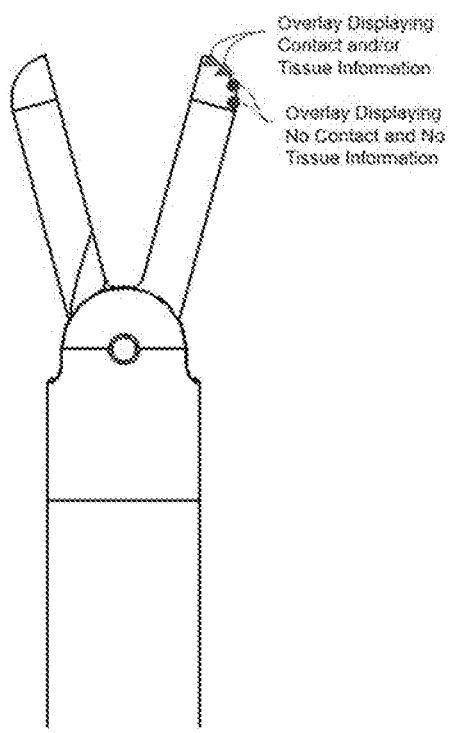
FIG. 5 illustrates another embodiment of an overlay display format.

FIG. 5 depicts an image of a surgical instrument as it might appear on a display, together with alternate rendered overlays representing obtained information. In this case the obtained tissue information may represent an interaction of the tissue with the edge of the instrument, namely the existence or lack of existence of contact between a part of the instrument and tissue, or an identification of the part of the instrument that is contacting tissue and the part of the instrument that is not contacting tissue. In the specific overlays shown, triangles mark a portion of the jaw exterior that is in contact with tissue, and the circles mark a portion of the jaw exterior that is not in contact with tissue. Alternatively, these overlays might represent that tissue information is available or unavailable for tissue in contact with that part of the jaw, or they might represent a particular characteristic of that tissue. The detected information depicted by the overlay may be from a single point of measurement, multiple discrete measurement points, or a continuous measurement or feedback area.

The overlays in an embodiment such as that shown in FIG. 5 may be formed of various shapes, patterns icons, line types, or any combination thereof. Other information that might be communicated using this type of overlay includes a representation of the tissue contact force, optionally using some of the color changing principles (or other types of changes such as pattern changes, or changes in line weights or overlay size) discussed above for depicting changes in contact force.

The concepts described here may also be used to present to the surgeon information obtained about other structures present in the field of view of the video display being observed by the surgeon. Overlays of the type shown in FIGS. 2(a) through 3 and described in the accompanying text may be rendered to highlight to the surgeon where the tips of the jaws are and/or where the shaft of the grasper is. This information may be determined using computer vision/image processing to identify the edges of the tool, or identify markers or fiducials attached to or etched onto the instrument shaft or jaws. The overlay may be positioned by the system over the fiducials or another area of the instrument.

Supplemental embodiments may include the use of text captions or other means of highlighting important areas including outlines or enclosed volumes around specific points of interest.

Additional forms of communication to the user might include the use of sound. This might be used to help the surgeon search the work site for objects/tissue of particular importance. For example, the system might emit a sound that changes in frequency in one direction (i.e. higher or lower) as the surgeon moves the instrument closer to a tissue type or object that is of interest, and that changes frequency in the opposite direction as the instrument is moved away from the tissue type/object. This can be particularly useful when searching for tissues/objects that are below the surface of the tissue at the worksite. In other implementations, a certain tone may also occur when the distance between the instrument and the tissue crosses a defined distance threshold. In a variation of this embodiment, multiple thresholds with multiple tones may be used, each tone indicating that a different defined distance threshold has been crossed. These segmented thresholds may provide more clear assurance that a certain distance to/from an object or structure has been achieved. In another variation, This may also be accomplished with a series of clicks whose inter-click period changes as the distance changes (analogous to a Geiger counter). Audio feedback could also be combined with visual feedback to report tissue characteristics to the surgeon, or used alone to indicate when the user is touching tissue having characteristics of interest.

Additional embodiments may include haptic or tactile feedback—e.g. using linear resonating actuators or eccentric motors within the handles grasped by the user at the surgeon console—to generate haptic cues to communicate not only that the surgeon has grasped or touched tissue, but also the pathology of the tissue being grasped. As an example, the handles may vibrate during removal of cancerous tissue if the surgeon has started to remove adjacent viable healthy tissue. The frequency of the haptic/tactile feedback is selected to stimulate receptors in the user's hands, without inducing unintended input motion of the user's hands. Alternatively, vibrations may be induced by a haptic controller using the motors already included in the handles 17, 18 for providing the 3D haptic feedback that allows the surgeon to feel on the input devices 17, 18 the forces exerted by the instruments on the patient's tissues.

In some embodiments, the metrics or overlays may persist in the image, and the surgical system may keep track of the tissue metrics in 3-dimensional space. The position and orientation of the end effectors is well-known by the surgical robotic system along with their relation to the endoscope (either because the endoscope is also controlled by the surgical robotic system or via machine vision techniques). Thus, it is possible to build up a 3-dimensional map of tissue information. These overlays may persist over time, or be recorded to be recalled to the user interface at some time in the future.

Structural scanning and mapping and/or tissue deformation modeling may be used to keep the overlay positioning accurate as the soft tissue deforms.

The concepts disclosed in this application allow for real-time communication of pathology results to the surgeon through a robotic surgical console through any of the following means: visual overlays, outlines, or captions, audible descriptions and surgeon console handle vibrations.

Applications and patents referred to herein, including for purposes of priority, are incorporated herein by reference.

What is claimed is:

1. A method for augmenting an image displayed to a user during a surgical procedure, comprising:
    positioning an endoscopic camera within a body cavity;
    positioning a surgical instrument at an anatomical site within the body cavity;
    using a robotic manipulator, robotically maneuvering the surgical instrument within the body cavity towards tissue in the body cavity;
    grasping the tissue at the anatomical site using jaws of the surgical instrument and determining grasping forces imparted to the tissue by the surgical instrument;
    capturing real time video images of the anatomical site using the endoscopic camera and displaying the real time video images on a display in real time, wherein said real time video images include real time video images showing the jaws of the surgical instrument with the tissue between said jaws;
    displaying graphical indicia as overlays on the real time video displayed in real time, the displayed graphical indicia representing a degree of the grasping forces.

2. The method according to claim 1, wherein said real time video images include real time video images showing the surgical instrument within the working site, and the indicia includes a graphical marking overlaying the displayed image of the surgical instrument.

3. The method according to claim 2, where the graphical marking includes color shading or a pattern on at least a portion of the displayed image of the surgical instrument.

4. The method according to claim 2, wherein the surgical instrument has jaws and the graphical marking is displayed on the image of the jaws of the surgical instrument.

5. The method of claim 1, further including applying computer vision to the image to detect edges of the surgical instrument within the body cavity.

6. The method of claim 1, wherein determining forces includes determining the forces using input from a Fabry-Perot interferometer.

7. The method of claim 1, wherein determining forces includes determining the forces using input from a Fiber-Bragg grating.

8. The method of claim 1, wherein determining forces includes determining the forces using input from a strain gauge.

9. The method of claim 1, wherein determining forces includes determining the forces using input from a load cell.

10. The method of claim 1, wherein determining forces includes determining the forces using input from a force sensor within the robotic manipulator.

11. The method of claim 1, wherein determining forces includes determining the forces using input from a force sensor on the surgical instrument.

12. The method of claim 1, wherein the surgical instrument includes jaws and the method includes grasping tissue using the surgical instrument using the jaws.

13. The method of claim 1, wherein the indicia is a graphical overlay having a color that changes along a color spectrum as the force increases or decreases.

14. The method of claim 1, wherein the indicia is a graphical overlay has a first color when the force is below a predetermined force threshold and a second color when the force is above the predetermined force threshold.

15. The method of claim 14, wherein the graphical overlay has a third color when the force is above a second predetermined force threshold, the second predetermined force threshold being higher than the first predetermined force threshold.

16. The method of claim 1, wherein the indicia is a graphical overlay having a size that increases as the force increases and that decreases as the force decreases.

* * * * *